United States Patent [19]

Raschke

[11] Patent Number: 4,687,314
[45] Date of Patent: Aug. 18, 1987

[54] SHUTTER RELEASE MECHANISM FOR AUTOMATIC CAMERAS

[75] Inventor: Klaus Raschke, Schaumburg, Ill.

[73] Assignee: W. Haking Enterprises Limited, Hong Kong, Hong Kong

[21] Appl. No.: 825,797

[22] Filed: Feb. 7, 1986

[51] Int. Cl.$^4$ .......................... G03B 3/00; G03B 9/14; G03B 9/62

[52] U.S. Cl. ..................... 354/400; 354/230; 354/267.1; 354/247

[58] Field of Search ............... 354/400, 402, 403, 404, 354/405, 195.1, 230, 247, 260, 266, 267.1

[56] References Cited

U.S. PATENT DOCUMENTS

| | | | |
|---|---|---|---|
| 3,274,914 | 9/1966 | Biedermann et al. | 354/405 X |
| 4,355,872 | 10/1982 | Kitai et al. | 354/400 |
| 4,614,417 | 9/1986 | Hato et al. | 354/403 |

FOREIGN PATENT DOCUMENTS 98414  6/1985  Japan ................................. 354/400

*Primary Examiner*—W. B. Perkey
*Attorney, Agent, or Firm*—Russell E. Hattis; Stephen R. Arnold

[57] ABSTRACT

A delayed shutter actuation system for cameras providing from pre-flash or ambient light sensings automatic focusing control, automatic aperture control, or both, features a spring-energized shutter slide member coupled to a velocity limiter over an initial portion of the release stroke. A spring-driven focus control member, or a spring-driven exposure control member, or both, are coupled through movable regulator members to the shutter slide through lost motion couplings so that their respective movement rates are governed by the velocity limiter until they are locked in proper position by electrically controlled locks controlled responsively to such sensings. During a terminal portion of the motion of the shutter slide the velocity limiter automatically disengages to allow an unimpeded motion of the slide to actuate the shutter. In the preferred form of the invention exposure control is secured by using a variable-aperture impulse shutter and a stroke-control cam positioned as a rebound limiter and rotatingly oriented responsively to motion of the exposure control member.

14 Claims, 9 Drawing Figures

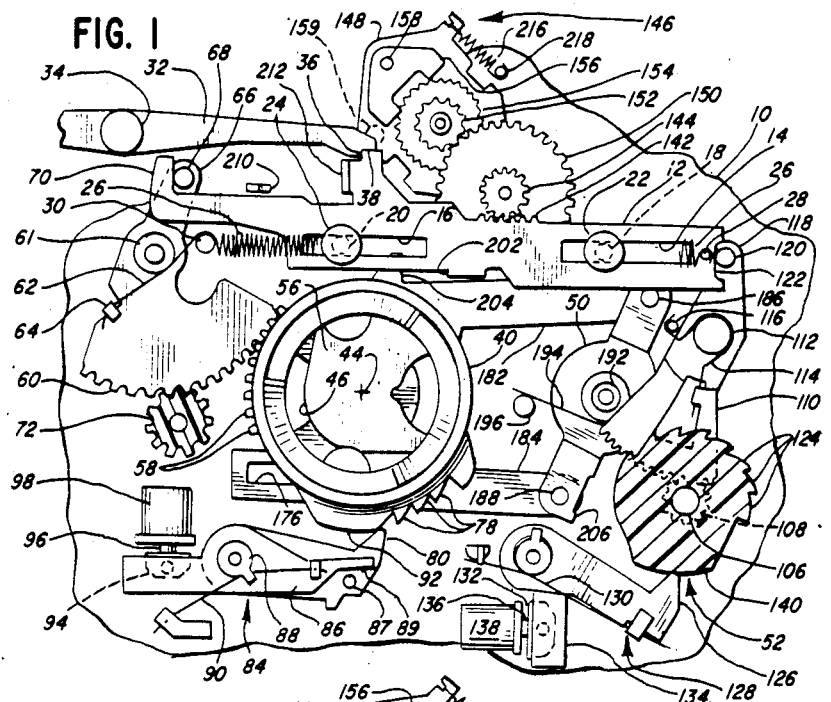
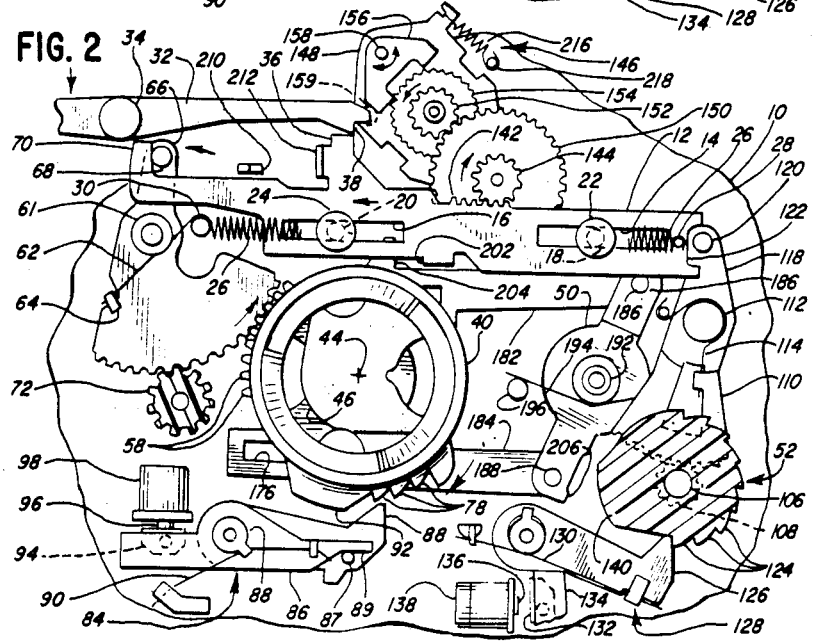

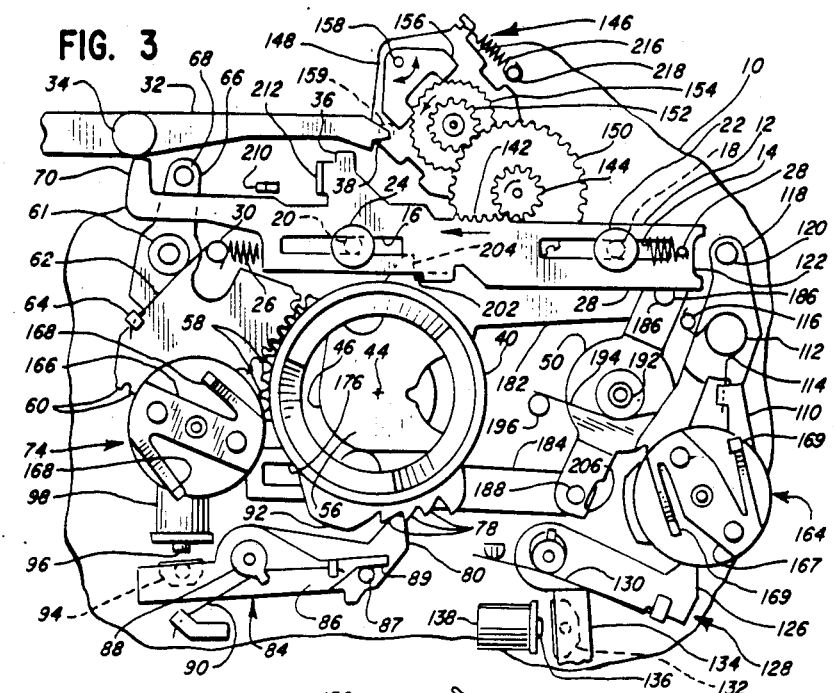

SHUTTER RELEASE MECHANISM FOR AUTOMATIC CAMERAS

TECHNICAL FIELD

The technical field of the invention is shutter release systems for cameras, and in particular shutter release systems for electronically controlled cameras provided with either automatic focusing or automatic exposure setting mechanisms which provide these adjustments attendant to operation of the shutter release system.

BACKGROUND OF THE INVENTION

Automatic cameras now widely known in the art provide for automatic focusing and/or automatic lens aperture setting attendant to operation of the shutter release system. Such systems typically provide, upon initial operation of the shutter release button, a distance sensing and an illumination sensing operation. The former sensing operation produces an electrical control signal condition in the camera circuitry indicative of the distance to the object, and the latter sensing operation provides a similar control signal condition indicative of the brightness of the object under ambient illumination.

Responsively to these two sensing operations, the lens system is mechanically driven through a range of positions. Frequently a multi-position electrical contactor or synchronously driven potentiometer is used to provide an electrical signal condition indicative of the instantaneous lens position. The range control signal and the position-indicating signal condition are compared, by associated control circuitry to terminate the lens focus drive at the appropriate point. An aperture or shutter control system is similarly set into a state of motion to be similarly terminated at a position which will govern the degree of exposure of the film. This latter feature may take a variety of forms, such as a rotating drive for a conventional iris-type aperture. In the alternative it may also control exposure by controlling the action of the shutter itself. This shutter control may take a variety of forms, including controlling the separation between the two curtains of a focal-plane shutter, controlling the stroke length of an impulsively actuated shutter blade so as to govern the time necessary for it to return to a closed position, or the duration of the engagement time of a shutter blade initially engaged by the shutter release mechanism during the exposure process.

A common variant in such exposure control systems is to make the shutter from a pair of blades of overlapping configuration and shaped so that as they are moved apart from a closed position a progressively increasing aperture is formed therebetween, this relative motion between the two blades being subsequently reversed to terminate the exposure cycle. Such variable-aperture shutters are typically positioned at a point in the optical train to act as aperture stops, rather than field stops, for obvious reasons.

To provide for proper focusing, many of the more advanced automatic focusing systems provide for a substantial number of pre-established intermediate positions, to any one of which the lens may be driven. A scanning drive is most typically supplied by an energizing spring member, and is most typically terminated by a locking engagement of a pawl or similar mechanism which is electrically actuated to arrestingly terminate the scanning movement of the lens at one of these preset positions. Because of related timing and inertial effects, it is found to be necessary to couple some form of mechanical velocity regulator to the focus drive system to prevent excessive velocity build-up under the action of a drive spring sufficiently strong to give rapid initial acceleration. Here the objective is to secure a rapid acceleration of the system to a moving condition, but to hold the maximum resulting velocity to a reasonable limit so as to allow sufficient time for precise engagement of the stopping pawl, or other mechanism, into proper locking engagement with the focus drive system.

With respect to exposure control, and considering in particular the use of a variable aperture impulse-driven shutter to secure this feature, frequently a variable position shutter blade rebound stop member is employed to control the length of the shutter stroke, and hence the exposure. This stop is similarly spring driven from an initial position through a range of positions. This stop member is similarly locked by an engaging pawl or member at an appropriate position responsively to a control signal from the exposure control circuitry. Such a rebound stop must be similarly rapidly accelerated and thereafter held at a reasonable velocity to allow the locking mechanism to function with adequate precision.

Thus, both drive systems are typically initially cocked to a latched spring-loaded condition, released therefrom attendant to shutter button depression to have their velocities thereafter held at a relatively low value, and then are positively arrested at appropriate terminal positions. After both drive systems have been arrested, the shutter release system must automatically energize the shutter blades, this system also having been initially held in a cocked condition against the force of a shutter spring.

Prior art systems which provide for the necessary velocity-limiting of even a single scanning system, e.g., focus drive, and which provide for properly synchronized actuation of the shutter after termination of the scanning operation, generally suffer from undue complexity or expense, or tend to be wasteful of space. One basic problem which all such systems must cope with is the problem that the scanning system must be capable of stopping at an arbitrary point, after which time the shutter must be synchronously operated. One approach is simply to add an additional velocity limiter to a shutter-actuating member, most typically a spring-energized slide, the slide velocity regulator being arranged to prevent any substantial motion of the slide during the time necessary for movement of the scanning system to its most extreme position, after which time the slide velocity limiter disengages. The slide then is accelerated under the force of its energizing spring to impulsively actuate the shutter blades through an exposure cycle. Such systems require a pair of release latches which, when simultaneously released, release the shutter slide and the drive system from a cocked condition to carry out their respective motions. Furthermore, there must be provided cocking means for restoring both systems into engagement with their respective latches. Such systems are, in general, as stated above, complex.

An alternative approach is to omit the above-mentioned shutter slide velocity limiter, and to use instead a properly synchronized electromagnetic release of cocking the shutter slide from its associated latch. Associated control circuitry is used to operate the shutter latch to a released condition after the scanning drive-terminating control signal has been sensed. Such systems tend to be expensive, as compared to the double velocity-limiter system described above, since they replace the shutter slide velocity limiter at the cost of adding an electromagnet. As in the previous system, provision must be made for returning the scanning drive system and the shutter slide to a cocked condition by engaging a pair of release latches.

It would therefore be a desirable feature to provide in a camera having automatic focus and/or exposure setting capability a greatly simplified mechanical shutter release system.

SUMMARY OF THE INVENTION

According to one of the features of the invention, a shutter actuating means (such as a shutter-actuating slide member) having a striker portion for energizingly striking a shutter is held in a cocked position against the force of a slide energizing spring by a single release latch actuatable to a released condition upon depression of the shutter button. At least one scanning drive system (either focus drive or exposure control drive), powered in the example shown by an energizing spring, is releasably coupled to the shutter slide so as to be held in a cocked starting position by the shutter slide latch. A velocity limiter, preferably in the form of a constant velocity escapement, is configured for engagement with the shutter-actuating slide only over an initial portion of the motion thereof after the release latch is tripped. This engagement is retained for sufficient time to allow the driven element (focus control member or exposure control member) to move to its opposite extreme position, if necessary, before disengagement of the velocity limiter from the shutter slide.

The scanning drive system is coupled to the shutter-actuating slide so that the speed of the scanning drive system is retardingly governed by the velocity limiter. Thus, the scanning drive system is held to a limited velocity throughout its entire range of adjustment. The coupling between the scanning drive system and the shutter slide, preferably configured as a lost-motion coupling, permits total disengagement of the scanning drive system, and in particular the force of the drive energizing spring, from the shutter-actuating slide attendant to freezing of the scanning drive system at its appropriate position by its associated scene sensing circuitry. Thereafter the shutter slide travels a short distance, whereupon the velocity limiter disengages from it. The shutter slide, now actuated solely by its own energizing spring, accelerates to strike the anvil of the shutter to actuate exposure. During the cocking return of the shutter slide, the coupling between the scanning drive system and the shutter slide is again re-established, the terminal portion of the cocking phase bringing the shutter slide and the drive system once again to their initial positions against the force of their energizing springs, the shutter slide again being captively secured by the release latch. A single release latch, a lost motion coupling, and a single automatically disengaging velocity limiter thus provide all of the necessary synchronization features at an absolute minimum of parts and system complexity.

According to a specific feature of the invention two such lost-motion couplings are provided, one to engage a focusing drive member coupled to move the lens, the other to engage an exposure control drive member, the position of which controls the exposure. During the initial phase of motion of the shutter slide subsequent to tripping the release latch, both scanning drive mechanisms are limited to the velocity set by the velocity limiter, each scanning drive mechanism disengaging from the shutter slide when its associated arresting mechanism is energized, the subsequent system motion proceeding as previously described.

According to a further feature of the invention the shutter system is of the progressively increasing aperture (variable aperture) type, and the exposure control feature is provided by rotating a cam responsively to the motion of the exposure control regulator member so as to rotate the cam to a a chosen orientation according to the previously mentioned sensings of the brightness of the object to be photographed. The cam is positioned to act as a variable-position rebound stop to limit the length of the advancing stroke of the variable aperture shutter. Thus, according to cam orientation the stroke will be short under high scene illumination and long under low scene illumination, thus controlling the exposure.

The present invention thus accomplishes with great simplicity what previous designs have only accomplished with substantial complexity. Total synchronization of all elements is secured using only a single release latch and a single velocity limiter. Other advantages and aspects of the invention will become apparent upon making reference to the specification, claims, and drawings to follow.

BRIEF DESCRIPTION OF SEVERAL VIEWS OF DRAWINGS

FIG. 1 is a partially cutaway front elevational view of the principal components of a shutter release system, a focus control system, and an exposure control system as mounted on a rear mounting board, the system being in a cocked condition.

FIG. 2 shows the elements of FIG. 1 in an intermediate condition during actuation of the shutter release cycle at a time when the exposure control system has been finally positioned, but before a focus control system has reached its final state.

FIG. 3 is similar to FIG. 1, further showing a pair of rotary exposure and focus control contactors not shown in FIGS. 1 and 2, and further showing the system with both control systems in a final position prior to opening the shutter.

FIG. 4 is similar to FIG. 3, further having central components removed to show the initial phase of the opening of a pair of variable aperture shutter blades.

DETAILED DESCRIPTION

Figure 5:
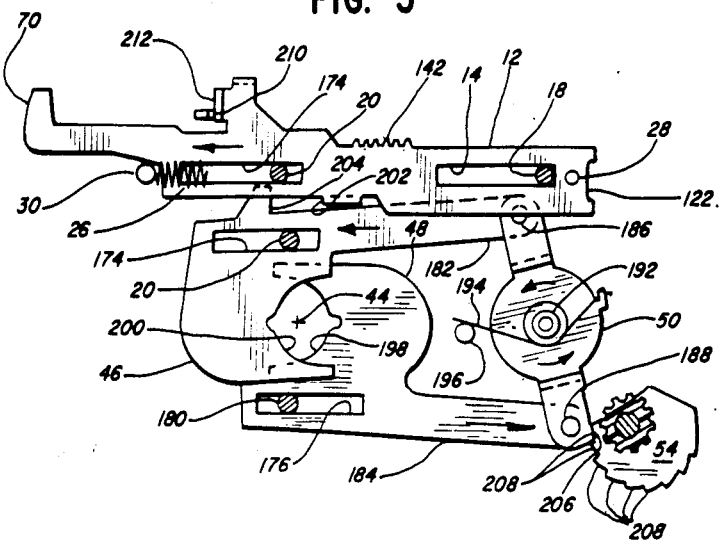
FIG. 5 shows the principal elements of FIG. 3 at the extreme open limit of the shutter blades.

FIG. 1 shows in partial cutaway form the principal elements of the shutter release system of the present invention mounted on a rear mounting board 10. A shutter actuating slide 12 having a pair of elongated guide slots 14,16 disposed along the length thereof is held slidably secured to the rear mounting board by guide pins 18,20 having retaining crowns 22,24 thereon. A slide energizing spring 26 fastened at its righthand end to the shutter slide by a post 28 and at its lefthand end to the rear mounting board 10 by a pin 30 thus urges the shutter slide to the left. A shutter release bar (release lever) 32, rotatably mounted on a pivot 34, is configured at the righthand end with a release bar latch face 36 confronting a complementarily configured shutter slide latch face 38 provided on an extension of the shutter slide 12. Spring bias means 11 (not shown in FIG. 1; see FIG. 9) urge the shutter release bar 32 clockwise to hold the shutter slide 12 to the right in a cocked position as shown. A counterclockwise rotation of the shutter release bar 32 will release the latch engagement, allowing the shutter slide 12 to move to the left under the action of the slide energizing spring 26, ultimately to actuate the shutter through an exposure cycle.

Two principal control systems are also shown in FIG. 1. One system rotates a focus control ring 40 which varies the position of a lens cell assembly 42 along the optic axis 44, as shown in better detail in FIG. 8. The other system controls the exposure by adjusting the maximum stroke of an impulse-driven variable aperture shutter 46,48,50 as best shown in FIG. 5. An exposure control cam assembly 52 carries an integral step-shaped stroke limiter cam 54 disposed to obstructingly limit the shutter stroke. Rotation of the exposure control cam assembly 52 to a suitable point before the shutter is driven open will control the exposure, as will be discussed.

Considering first the focus control system in more detail, the rotatably mounted focus control ring has a central clear aperture 56. Gear teeth 56–58 are provided along one margin thereof engaging confronting teeth of a rotatable focus drive sector gear 60 mounted on a pivot 61. A focus drive energizing spring 62 attached at one end to pin 30 mounted on the rear mounting board and at the other to a post 64 on the sector gear 60 urges the sector gear in a counterclockwise direction. The focus drive sector gear 60 has a regulator extension 66 carrying a regulator pin 68 at the end thereof disposed so that the pin confronts an extension hook 70 on the shutter slide 12. In the cocked stage shown in FIG. 1, the engagement of the regulator pin 68 with the hook 70 prevents the sector gear 60 from rotating so as to drive the focus control ring 40 through the focusing range of the lens. A pinion 72 is further provided which is constantly engaged with the sector gear 60 throughout its entire range of positions, this pinion being integral with a focus control rotary contactor assembly 74 (see FIG. 3) which provides to a control circuit 76 (see FIG. 9) sensing information indicative of the orientation of the lens focusing ring 40, and hence of the lens focusing distance, during the rotation of the lens focusing ring during the shutter system actuation cycle.

The lens focus control ring 40 has along one edge thereof a number of ratchet teeth 78–78 disposed to serially confront a pawl 80 mounted on the end of a pawl arm 82 as the focus control ring is driven clockwise during the exposure cycle. The pawl arm is part of a focus control pawl assembly 84 including a control arm 86, both the pawl arm and the control arm being pivotally mounted on a common pivot 88. A pair of control pawl springs 90 (one not shown) bias the pawl arm 82 counterclockwise with respect to the control arm 86, and the control arm counterclockwise with respect to the pivot 88. In the cocked condition shown in FIG. 1, the pawl 80 is held in a retracted position by a cam lobe 92 adjacent the ratchet teeth 70–78 on the focus control ring 40, thus forcing the pawl arm 82 clockwise, which in turn because of the spring coupling therebetween, forces the control arm similarly clockwise. The motion of the control arm is limited by engagement of a magnetic armature 94 carried in one end thereof contactingly engaging a pole piece 96 of a focus control solenoid 98. A lost motion coupling between the pawl arm 82 and the control arm 86 consisting of a pin 87 on the pawl arm confronting an engaging face 89 on the control arm permits a secure pressing engagement between the armature 94 and the pole piece 96 without stressing the focus control pawl assembly 84.

Figure 9:
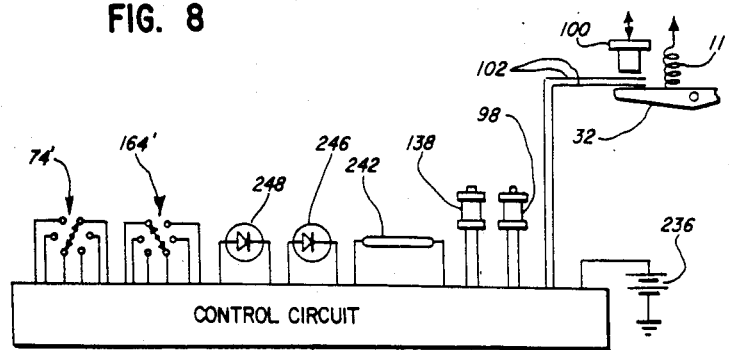
FIG. 9 is a block schematic diagram of a control circuit governing the focus and exposure control systems.

As will subsequently be discussed, the control circuit shown in FIG. 9 is arranged so that when the shutter button 100 is depressed a control switch 102—102 is closed immediately before sufficient force is transferred to the shutter release bar 32 to release the shutter slide 12 from its cocked and latched position. As a result, the focus control solenoid 98 will hold the pawl 80 away from the ratchet teeth 78—78 of the rotating focus control ring 40 until deenergized at an appropriate time to freeze the control ring at the proper focusing position.

Considering next the exposure system in more detail, the rotatable exposure control cam assembly 52 rotatably mounted on a pivot 106 carries a pinion 108 integral therewith which engages an exposure control sector drive gear 110 rotatably mounted on a pivot 112. An exposure cam energizing spring 114 secured at one end to a post 116 fastened to the rear mounting board 10 and at the other to a portion of the sector drive gear 110 urges the sector gear in a counterclockwise direction, so as to rotate the exposure control cam assembly 52 in a clockwise direction. As in the case of the focus drive sector gear 60, the exposure control sector gear 110 is provided at one end thereof with a regulator extension 118 and a regulator pin 120, the pin being disposed in confronting engagement with a cutout 122 in the righthand end of the shutter slide 12. The exposure control cam assembly is provided with a number of ratchet teeth 124—124 disposed to serially pass an opposing exposure control pawl 126 mounted on a rotatable exposure control pawl assembly 128. The exposure control pawl assembly 128 functions in the same manner as the focus control pawl assembly 84, having a similar lost motion provided by control pawl springs 130 (one not shown) and a magnetic armature 132 at one end of an exposure control arm 134. This armature 132 is similarly held against a pole piece 136 of an exposure control solenoid 138 when a prominent exposure control cam lobe 140 confronts the exposure control pawl in the cocked state. As in the case of the actuation of the focus control system, the exposure control solenoid 138 is energized throughout an initial portion of the shutter actuation sequence until deenergized by the control circuit 76, thus causing the exposure control pawl 126 to engage one of the ratchet teeth 124—124 on an exposure control cam 111 integral with the exposure control cam assembly 52 to freeze the motion of this assembly at an appropriate position.

Provision is made to retard the leftward velocity of the shutter slide 12 upon tripping of the shutter release bar 32, so as to provide adequate time for the positioning of the focus and exposure control systems. This mechanism takes the form a of toothed rack 142 provided along a portion of the upper edge of the shutter slide so as to be engageable to a pinion 144 of a velocity limiter assembly 146 mounted on a mounting plate 148. The velocity limiter takes the form of a gear train 150,152,154 driven by the pinion gear 144 as the rack 142 moves by, the gear train having its ratio such that a very high rate of rotation is imparted to the final gear 154 thereof. An oscillating fork 156 rotatably mounted on a pivot 158 is provided with a pair of tines 160—160 is disposed so that the tines are in confronting relationship with the serially presented teeth of the final gear 154. The spacing and configuration of the tines 160—160 is such that when the final gear 154 is rotated the impulsive alternate striking of the two tines by serially presented gear teeth sets up a rapid reciprocating oscillation of the fork 156 about its pivot pin 158, resulting in a significant limitation in the driven speed of the final gear. This limitation reflects back to the pinion gear 144 engaged with the rack on the shutter slide 12, resulting in a substantial limitation of the velocity of the shutter slide as long as the rack and the pinion gear are engaged, i.e., during initial phases of actuation of the shutter release system. It should be noted that during initial phases of actuation of the system, all three energizing springs 26,62,194 are forcing the shutter slide 12 to the left against the retarding influence of the velocity limiter 146.

The velocity limiter 146 shown herein represents merely one of a great many possible types. Fully equivalent limiters or regulators may be fashioned analogously to clock escapements, or as constant velocity centrifugal clutch systems, or simply as a high reflected inertial mass system involving a gear-coupled flywheel.

FIG. 2 shows an early phase of the shutter release system shortly after the shutter actuator bar 32 has released the shutter slide 12 to begin its movement to the left. It will be noted that the pinion gear 144 of the velocity limiter 146 is still engaged, thereby exerting a retarding force against any excessive build-up in shutter slide speed. FIG. 2 shows the system shortly after the control circuit 76 (FIG. 9) has deenergized the exposure control solenoid 98, allowing the exposure control pawl 126 to engage one of the teeth 124—124 of the exposure control cam 111, thereby freezing the rotation of the exposure control cam assembly 52. The proper adjustment has thus been made to control the exposure.

This arresting of the rotation of the exposure control cam assembly 52 has the immediate consequence of freezing the rotation of the exposure control sector gear 110, as a result of which the regulator pin 120 is no longer in contact with the cutout 122 in the end of the shutter slide 12. In particular it should be noted that the force of the exposure cam energizing spring 114 no longer causes a leftward force on the shutter slide 12. With respect to the focus control system, this system is still being driven to rotate the focus control ring 40, proper focus position not having yet been attained. Here it will be noted that the focus drive energizing spring 62 is still exerting a leftward force on the shutter slide because the regulator pin 68 is still forced against the extension hook 70.

FIG. 3 shows a later stage in the shutter actuation sequence wherein the focus control solenoid 98 has been deenergized to drop the focus control pawl 80 to engage one of the ratchet teeth 78—78 of the focus control ring 40, thereby arresting the rotation of this element. Further, it will be seen that the shutter slide 12 has moved to a point such that the regulator pin 68 on the focus drive regulator extension member 66 is no longer in contact with the hook 70 at the end of the shutter slide 12, as a consequence of which the focus drive energizing spring 62 no longer contributes to the leftward force on the shutter slide. Additionally, the velocity limiter pinion 144 is on the point of disengaging from the shutter slide rack 142. Upon such disengagement, the shutter slide 12 will then travel to the left under an acceleration governed solely by the slide energizing spring 26.

Thus, irrespective of the additional forces initially supplied to urge the shutter slide 12 to the left by the two energizing springs 62,194, the action of the velocity limiter 146 has been such as to prevent any substantial velocity build-up in the shutter slide while the two regulator pins 68,120 were in contact therewith. As a result, the shutter slide velocity which will ultimately be imparted as an impulse to open the shutter blades 46,48 will invariably be essentially of the same magnitude. Thus, by the use of lost motion couplings between the shutter slide 12 and the regulator pins 68,120, and by the use of a single velocity limiter 146, adequate time has been secured to allow the relatively massive mechanical structures of the focus and exposure adjustment systems to move to their final positions, while still allowing for a reproducable uniform striking force applied to the shutter blade system 46,48,50 by the shutter slide.

Figure 8:
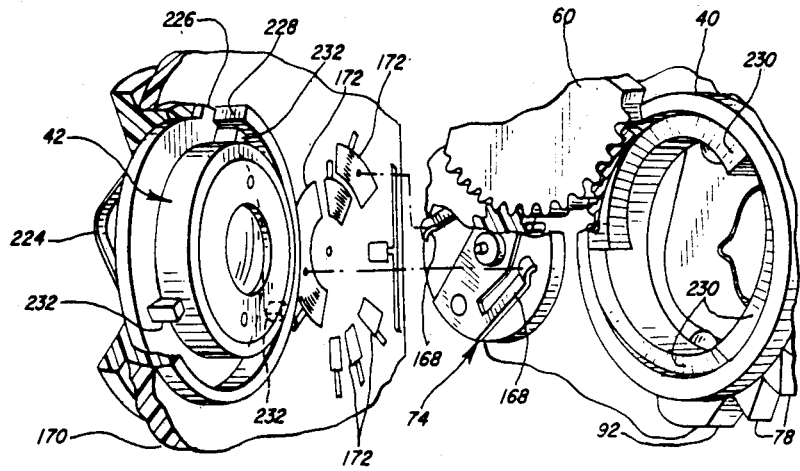
FIG. 8 is a fold-out view of the central region of the rear mounting board of FIG. 1 confronting a front mounting board carrying a lens cell assembly.

It will be noted with respect to FIG. 3 that the focus drive pinion 72 and exposure cam drive pinion 108 of FIG. 1 are respectively surmounted by the integral focus control rotary contactor assembly 74 and an exposure control rotary contactor assembly 164. Each assembly respectively has mounted on the forwardly facing surface thereof a central conducting strap 166,167 having pivotal integral contacting fingers 168—168,1-69—169 extending forwardly therefrom. FIG. 8 shows the relative position of the focus control rotary contactor 74 disposed generally opposite a front mounting board 170 having metallization pads 172—172 thereon. As the contactor 74 rotates, the fingers 168—168 shortingly bridge diametrically opposite pairs of these pads 172—172 to provide sensing information to the control circuit 76 shown in FIG. 9. A similar set of contacting pads are provided facing the contacting fingers 169—169 of the exposure control rotary contactor assembly 164. It is these sensings in conjunction with predetermined range and exposure information which are utilized by the control circuit 76 to deenergize the focus and exposure control solenoids 98,138 at the appropriate positions of the two systems.

FIG. 4 shows the initial phases of the opening of the shutter. The shutter will be seen to consist of overlapping upper and lower shutter blade leaves 46,48, each leaf having a guide slot 174,176 therein whereby the leaves are captively retained by a pair of guide pins 178,180. Each shutter leaf 46,48 is provided with a blade extension arm 182,184, the ends of each blade extension arm being attached by pivots 186,188 to the ends of a coupling bar mounted on its own pivot 192. A shutter return spring 194 anchored at one end to a portion of the coupling bar and at the other to a post 196 on the rear mounting board 10 provides a clockwise torque to the coupling bar to return the shutter blades 46,48 to the completely overlapping position wherein arcuate cutouts 198,200 in the shutter blade leaves are completely masked.

In the phase of shutter actuation shown in FIG. 4, the velocity limiter 146 already having been disengaged, the shutter slide 12 has moved rapidly to the left. An extension is formed on the lower edge of the shutter slide to form a striker 202, and a corresponding extension is formed at the upper edge of the upper shutter blade leaf 46 in a confronting relationship to form an anvil 204 in confronting relationship to the striker. FIG. 4 shows the early phases of shutter opening immediately after the striker 202 has struck the anvil 204 to impart a leftward movement to the upper shutter blade leaf 46, this movement being coupled to the lower blade leaf 48 by the coupling bar 50 to cause the lower shutter blade leaf to move rapidly to the right and in synchronism therewith against the force of the shutter return spring 194.

FIG. 5 shows the principal elements of the system at the extreme limit of travel of the shutter blades 46,48. It will be noted that the coupling bar 50 is provided with a small extension 206 generally confronting a series of cam steps 208—208 formed on the stroke limiting cam 54, this stroke limiting cam being integral with the exposure control cam assembly 52. Rotation of the exposure cam assembly 52 by a given amount positions the proper cam step to confront the coupling bar extension 206. The maximum stroke of the coupling bar 50 is therefore limited according to which cam step is positioned to confront it. The cutouts 198,200 in the shutter blade leaves 46,48 are configured so that the aperture of the shutter progressively increases as the stroke of the coupling bar 50 increases. Thus, by limiting the stroke of the coupling bar 50, the exposure is controlled. Immediately upon striking the interposed confronting cam step, the coupling bar 50 rebounds to drive the shutter leaves 46,48 to a closed configuration corresponding to that shown in FIG. 6.

Figure 6:
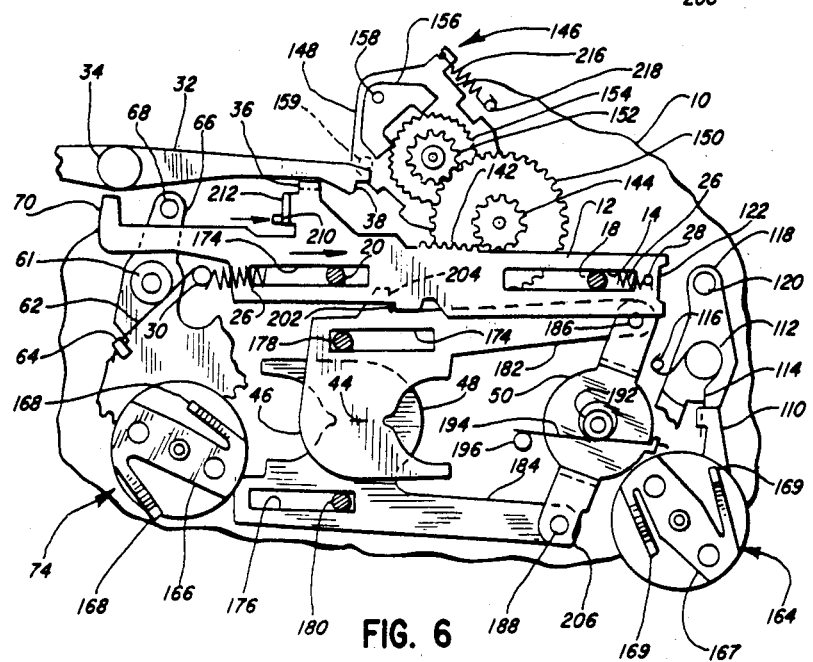
FIG. 6 shows the principal elements of the shutter system after shutter closure, and during the initial phase of a recocking operation.

FIG. 6 shows the initial phase of shutter recocking wherein a cocking lever 210, either electrically or manually actuated, has moved to engage a cocking face 212 configured on the shutter slide 12 to urge the slide to the right, ultimately to be captured once again by the shutter release bar 32 in the configuration shown in FIG. 1. It will be noted that during this process both regulator pins 68,120 will ultimately engage the shutter slide 12, thereafter rotating their associated sector gears 60,110 clockwise. This in turn will rotate the focus control ring 40 (FIG. 3) and the exposure control cam assembly 52 counterclockwise, their associated pawls 80,126 sliding over their confronting ratchet teeth 78—78,124—124, and ultimately being returned to the position shown in FIG. 1. Thus, not only is the shutter slide 12 itself recocked, but the focus drive system and exposure control system are both returned to the proper initial state.

Figure 7:
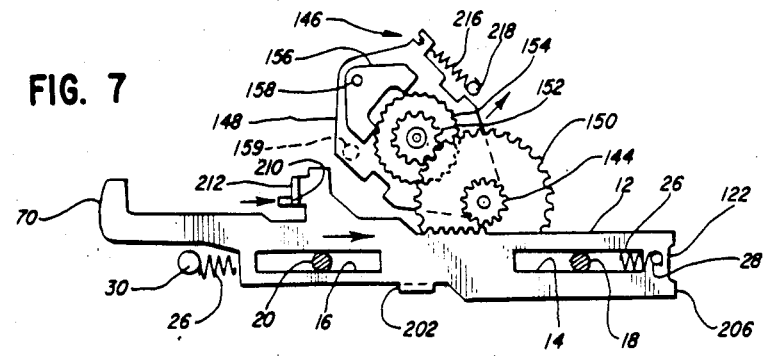
FIG. 7 shows details of a pivotally mounted velocity limiter engaging a portion of the shutter system during the cocking operation.

Provision is made that the velocity limiter 146 properly engages during recocking. With specific reference to FIG. 7, it will be seen that the velocity limiter mounting plate 118, pivotally mounted to the rear mounting board 10 by means of the pivot pin 159, is urged clockwise by a loading spring 216 connected at one end to the gear mounting plate 148 and at the other to a pin 218 secured to the rear mounting board. The entire assembly 146 is therefore urged clockwise by the spring 216, normally forcing the pinion 144 into engagement with the rack 142. Under shutter slide return, the velocity limiting feature of the velocity limiter 146 will pose a severe strain on the system, in particular on, the teeth of the rack 142 and the pinion 144, since its function is not to allow the pinion 144 to rotate rapidly. By allowing the pivoting disengagement shown in FIG. 7, this problem is effectively overcome.

FIG. 8 shows further details of the lens focusing system. The camera lens 43, mounted in the lens cell assembly 42, is movably retained in a lens cell receiving sleeve 222 extending from the front mounting board 170 generally towards, and coaxially disposed with respect to, the focus control ring 40. A wave spring 224 disposed between the front mounting board 170 and the cell assembly tends to force the lens cell 42 towards the focus control ring, and an antirotation lug 226 guided by a lug guide slot 228 (one wall cut away for clarity) in the lens cell receiving sleeve 42 prevents rotation of the lens cell. With reference to the focus control ring 40, it will be seen that along the inner periphery of the ring are three annularly disposed ramps 230—230. The lens cell 42 is provided along the peripheral edges thereof with three ramp follower lugs 232—232, each lug being positioned to confront one of the three focus control ring ramps 230—230. Rotation of the focus control ring 40 counterclockwise as shown in FIG. 8 then causes each ramp 230—230 to force its associated follower lug 232—232 forward against the force of the wave spring 224, thereby moving the lens 43 progressively farther away from the rear of the camera.

With respect to representative control circuitry shown in block diagramamtic form in FIG. 9, a great variety of well known techniques may be used to accomplish the necessary control functions related to the focus and exposure adjustment systems described hereinabove. For example, the control circuit 76, powered by a battery 236, may be actuated to an active condition upon depression of the camera shutter button 100, here shown provided with pair of switch contacts 102—102 disposed between the shutter button and the leftmost end of the shutter release bar 32 shown in FIG. 1, the bar being urged in a clockwise direction by a loading spring 11. The control circuit 76 may be brought to an active condition before the shutter release bar 32 disengages the mechanical systems from a latched condition by contacting closure of these switch fingers 102—102 before shutter button pressure is applied to the shutter release bar. In such a case, well known techniques may be employed to provide for immediate energization of the exposure and focus control solenoids 138,98, and for providing for an immediate ranging pre-flash from an electronically powered flash tube 242, the reflected light intensity being detected by a first photodetector 246 to provide range information to the control system. Additionally, an ambient light photosensor 248 may also be employed to provide alternative control of the exposure control system for purely daylight operation. Similarly, the positional sensings of the rotary contactors 74,164, here shown schematically as a pair of rotary bridging switches 74' and 164' respectively, are fed to the control circuit 76 from their individual sensing pads 172—172 as the rotary contactors are rotated during the shutter actuation cycle. A great variety of techniques are known in the literature for accomplishing all of the aforementioned functions.

In summary of the foregoing, by the use of lost motion couplings and an intermittently coupled velocity limiter, the present invention may successfully employ very strong energizing springs to achieve reasonably rapid positioning of either the focus adjustment system or the exposure control system while still providing for a uniform shutter impulse irrespective of the final positioning of either of these systems. The necessity for multiple velocity limiters is eliminated, as is the need for any special mechanical synchronization members to insure that shutter opening is properly synchronized with respect to the positioning of the focus and exposure drive systems.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention, in appropriate instances even the specific claims involved should be construed in light of the doctrine of equivalents.

Thus, for example, although energizing springs are used as drive means for the rotary contactor assemblies of the two control systems, alternative configurations such as an electric motor drive through suitable friction or other threshold-disengaging clutches can equally will be employed without departing from the scope of the appended claims.

I claim:

1. In a camera having at least one of an adjustable focus lens movably responsive to a focus control member coupled thereto and movable over a range of positions establishing a range of focusing distances and an exposure control system adjustable over a range of exposure values responsively to the position of an exposure control member movable over a range of positions, control member drive means for operating at least one of said focus control member and said exposure control member to be driven over said range of positions from initial to final extreme positions thereof, locking control means for engagingly arresting the driven motion of said at least one driven control member according to scene sensings provided by at least one scene sensor, and a shutter system including shutter-actuating means movable against the force of a shutter energizing spring to be held in a cocked position by a releasable latch, said shutter-actuating means engaging said shutter to actuate a shutter exposure cycle during a terminal portion of the motion of the shutter-actuating means upon release of said latch, the improvement comprising:

velocity limiting means coupled to engage said shutter-acutuating means and limit the velocity thereof during an initial portion of the motion of said shutter-actuating means upon release of said latch and to disengage from said shutter actuating means prior to said engagement of said shutter; and regulator means for coupling the motion of said shutter-acutating means to said at least one driven control member during said initial portion of the motion of said shutter-actuating means so as to limit the speed of movement of said at least one driven control member, said regulator means including releasing means for releasing said regulator means from the coupled condition when the motion of said at least one driven control member is arrested by said locking control means, said velocity limiting means disengaging from said shutter-actuating means after said shutter-actuating means has travelled at least a distance corresponding to operation of said at least one driven control member over its entire range of positions and before engaging said shutter.

2. The camera of claim 1 wherein said regulator means includes a lost motion coupling linkage configured to provide for reestablishment of a coupled condition between said control member and said shutter-actuating means attendant to cocking return of said shutter slide to engage said latch so as to return said control member to said initial extreme position thereof against the force of said control member drive means.

3. The camera of claim 2 wherein said at least one driven control member is rotatingly driven over the outer range of positions thereof by said control member drive means, and said locking control system includes a ratchet positively coupled to the motion of said at least one driven control member and an engaging pawl movable between latching and non-latching positions with respect to said ratchet, said pawl being displaced to a non-latching position by said locking control system prior to release of said shutter release latch and to said latching position during subsequent motion of said at least one driven control member responsively to said scene sensing to lockingly arrest said at least one driven control member, said ratchet and pawl being configured to slippingly move past each other attendant to return motion of said control member to its initial position upon return of said shutter slide to its latched position.

4. The camera of claims 1, 2, or 3, wherein said control member drive system is powered by at least one energizing spring means.

5. The camera of claim 1 wherein said shutter-actuating means includes a shutter-striking shutter slide movable against the force of said shutter energizing spring to be held in a cocked position by said latch, and said velocity limiting means includes a gear-driven rotating velocity limiter coupled to said slide by gear teeth disposed along only a portion of said slide so as to gearingly couple said slide to said velocity limiter during an initial portion of the motion of said slide after release of said latch and to decouple said slide from said velocity limiter during a terminal portion of said motion of said slide.

6. The camera of claim 1 wherein said velocity limiting means includes limiter decoupling means for decoupling said velocity limiting means from a velocity-limiting coupled condition with said slide-actuating means attendent to a cocking return of said slide actuating means to engage said latch.

7. The camera of claims 1, 2, or 3, wherein said camera includes said exposure control system having said exposure control member, and said shutter is of the variable aperture type having a coupled pair of normally overlapping leaves configured so that when driven apart through a given stroke distance when struck by said shutter-actuating means the exposure is governed by said stroke distance, said exposure control member being in the form of a rotatable cam disposed to arrestingly limit said stroke distance over a range of values governed by the orientation of said cam, said cam being rotatingly driven by said control member drive system and arrested by said locking control system.

8. The camera of claim 4 wherein said camera includes said exposure control system having said exposure control member, and said shutter is of the variable aperture type having a coupled pair of normally overlapping leaves configured so that when driven apart through a given stroke distance when struck by said shutter-actuating means the exposure is governed by said stroke distance, said exposure control member being in the form of a rotatable cam disposed to arrestingly limit said stroke distance over a range of values governed by the orientation of said cam, said cam being rotatingly driven by said control member drive system and arrested by said locking control system.

9. The camera of claim 1 wherein said camera includes said adjustable focus lens, said focus control member, said exposure control system, and said exposure control member, said control member drive means driving said focus control member and said exposure control member over their respective ranges of positions, said locking control means arresting the driven motion of both of said control members, said regulator means coupling both of said control members to the motion of said slide-actuating means during said initial portion of the motion of said shutter-acutating means so as to limit the speed of movement of said control members and releasing from a coupled condition to each control member as it is arrested by said locking control means, said velocity limiting means disengaging from said shutter-actuating means after said shutter-actuating means has travelled at least a distance corresponding to operation of both of said control members over their entire ranges of positions and before engaging said shutter.

10. The camera of claim 9 wherein said regulator means includes a pair of lost motion coupling linkages configured to provide for reestablishment of a coupled condition between said control members and said shutter-actuating means attendant to cocking return of said shutter-actuating means to engage said latch so as to return said control members to the initial extreme positions thereof against the force of said control member drive means.

11. The camera of claim 9 wherein each control member drive system is powered by its own associated energizing spring means.

12. In a camera having an adjustable focus lens movably responsive to a focus control member coupled thereto and movable over a range of positions establishing a range of focusing distances, an exposure control system adjustable over a range of exposure values responsively to the position of an exposure control member movable over a range of positions, control member spring drive means for rotatably driving said control members over their respective ranges of positions from initial to final extreme positions thereof, locking control means for engagingly arresting the driven motion of said control members according to scene sensings provided by at least one scene sensor, and a shutter system including a shutter-actuating slide movable against the force of a shutter energizing spring to be held in a cocked position by a releasable latch, said shutter-actuating slide engaging said shutter to actuate a shutter exposure cycle during a terminal portion of the motion of the shutter-actuating slide upon release of said latch, the improvement comprising:

velocity limiting means coupled to engage said shutter-actuating slide and limit the velocity thereof during an initial portion of the motion of said shutter-actuating slide upon release of said latch and to disengage from said shutter actuating means prior to said engagement of said shutter; and regulator means for coupling the motion of said shutter-actuating slide to said control members during said initial portion of the motion of said shutter-actuating slide so as to limit the speed of movement of said control members, said regulator means including releasing means for selectively releasing said regulator means from the coupled condition to each of said control members when the motion of said control member is arrested by said locking control means, said velocity limiting means disengaging from said shutter-actuating slide after said shutter-actuating slide has travelled at least a distance corresponding to operation of both of said control members over their entire range of positions and before engaging said shutter, said regulator means including a pair of lost motion coupling linkages configured to provide for reestablishment of a coupled condition between said control members and said shutter-actuating slide attendant to cocking return of said shutter slide to engage said latch so as to return said control members to said initial extreme positions thereof against the force of said control member drive means, said shutter being of the variable aperture type having a coupled pair of normally overlapping leaves configured so that when driven apart through a given stroke distance when struck by said shutter-actuating means the exposure is governed by said stroke distance, said exposure control member being in the form of a rotatable cam disposed to arrestingly limit said stroke distance over a range of values governed by the orientation of said cam, said cam being rotatingly driven by said control member drive system and arrested by said locking control system.

13. The camera of claim 12 wherein said velocity limiting means includes a gear-driven velocity limiter coupled to said slide by gear teeth disposed along only a portion of said slide so as to gearingly couple said slide to said velocity limiter during an initial portion of the motion of said slide after release of said latch and to decouple said slide from said velocity limiter during a terminal portion of said motion of said slide.

14. The camera of claim 13, wherein said velocity limiting means includes limiter decoupling means for decoupling said velocity limiting means from a velocity-limiting coupled condition with said slide attendant to a cocking return of said slide to engage said latch.

* * * * *